May 13, 1941.  L. S. LACHMAN  2,241,952
STRUCTURAL MEMBER
Filed March 11, 1939  2 Sheets-Sheet 2
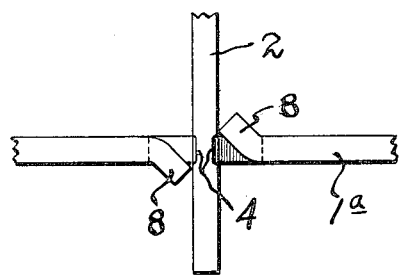
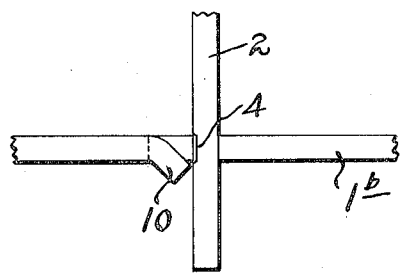
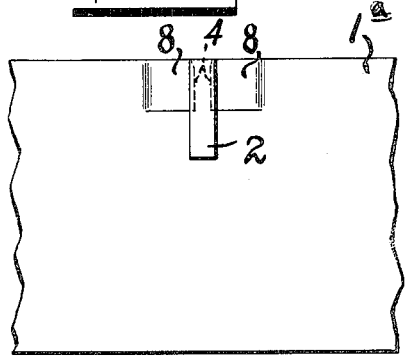
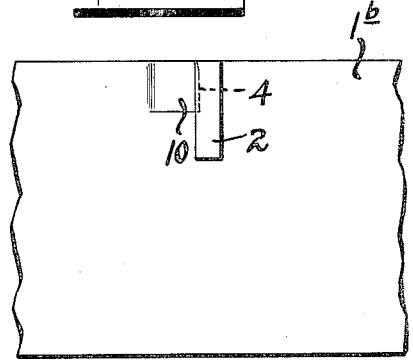
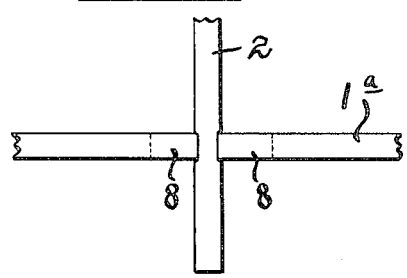
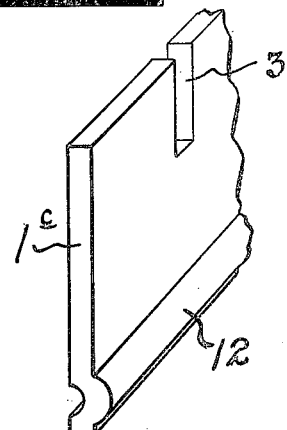
INVENTOR.
Laurence S. Lachman
BY
Danby & Danby
ATTORNEYS Patented May 13, 1941

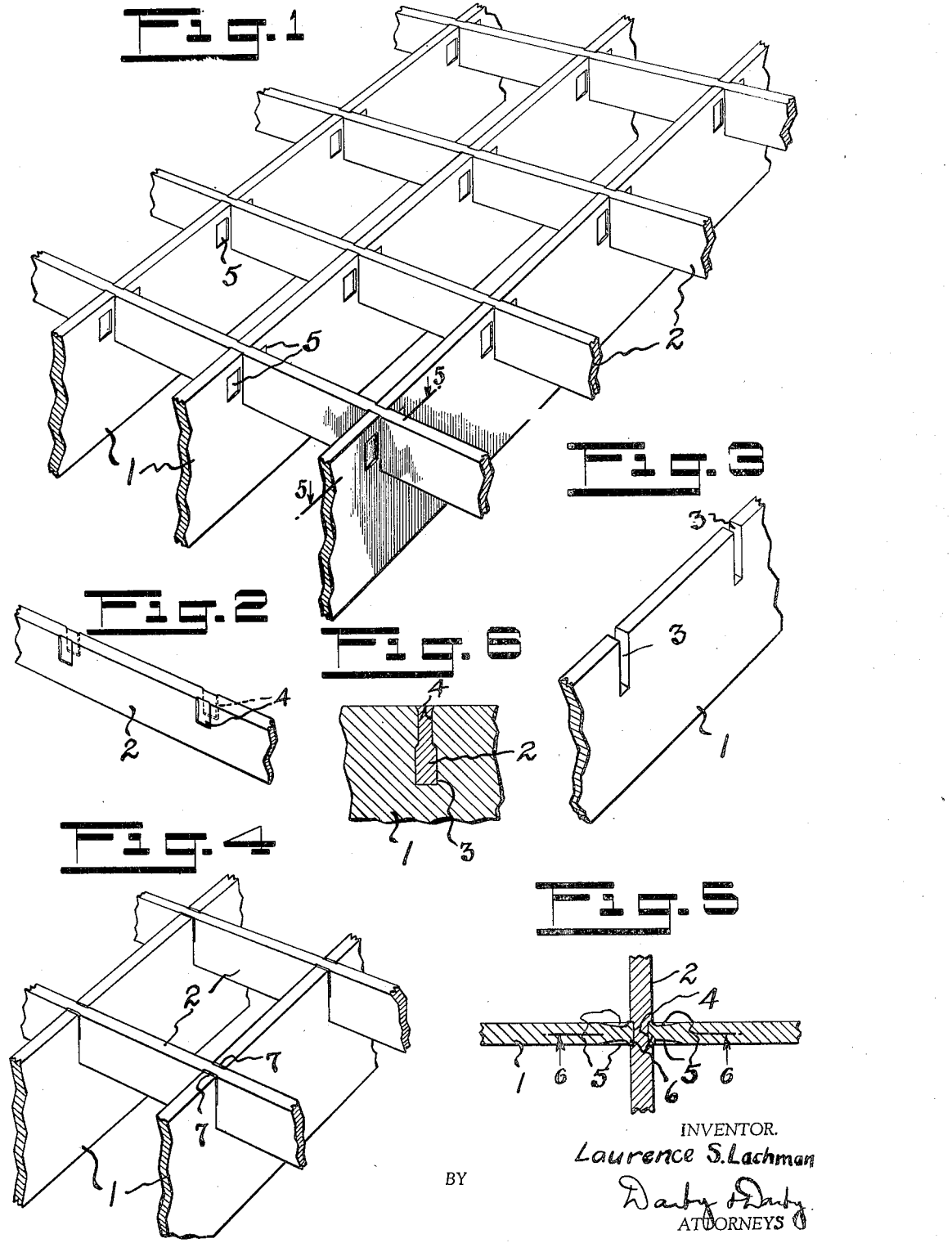

2,241,952

UNITED STATES PATENT OFFICE 2,241,952

STRUCTURAL MEMBER

Laurence S. Lachman, Forest Hills, N. Y.

Application March 11, 1939, Serial No. 261,245

2 Claims. (Cl. 189—82)

This invention relates to improvements in structural members involving in more specific terminology a grill which has many uses, such as bridge decking, gratings over subterranean cavities such as window wells, subway ventilating openings, and the like.

A general object of this invention is the provision of a grill of this type which when used in a horizontal position so as to bear vertical loads the main load bearing members thereof are under compression, that is, they may be said to be pre-loaded.

A more specific object of this invention is the provision of a novel construction in which the transverse bars and the longitudinal load bearing bars are mechanically interconnected without welding or the like to provide interlocks between the members which may be said to be inseparable short of destruction.

A still further object of the invention is the provision of mechanically interlocked transversely extending sets of bars which are secured together in such a manner as to place one set of bars, which may be termed the longitudinal or load bearing set, under compression at all times.

These and many other objects as will be apparent from the following disclosure are successfully secured by means of the invention herein disclosed in several different forms.

This invention resides substantially in the combination, construction, arrangement, and relative location of parts, all in accordance with this disclosure.

In the accompanying drawings:

Figure 1 is a perspective view of a portion of a grill constructed in accordance with one form of this invention;

Figure 2 is a perspective view of a portion of one of the transverse connecting bars;

Figure 3 is a perspective view of a portion of one of the longitudinal or load bearing bars;

Figure 4 is a perspective view similar to that of Figure 1 showing the parts assembled but before they are finally interlocked;

Figure 5 is a cross-sectional view taken on the line 5—5 of Figure 1;

Figure 6 is a cross-sectional view taken on the line 6—6 of Figure 5;

Figure 7 is a plan view of a modified form of interlocking connection between a longitudinal or load bearing bar and a transverse or interconnecting bar, showing the parts assembled but not interlocked;

Figure 8 is a side elevational view thereof with the bars interlocked;

Figure 9 is a view similar to Figure 7 with the bars interlocked;

Figure 10 is a plan view similar to that of Figure 7 of a modified arrangement;

Figure 11 is a side elevational view thereof with the bars interlocked; and

Figure 12 is a perspective view of a portion of one of the longitudinal or load bearing bars deformed to increase its strength.

Structural members, such as grills, gratings, and the like, employed in many places today as load bearing members, are made up of a series of interlocked or interconnected transverse or longitudinal bars. Heretofore, many arrangements have been devised for interconnecting or interlocking these sets of bars, involving all kinds of lapped joints, riveted connections, welded joints, and the like. Many of these prior arrangements have gone into use in spite of the fact that they had undesirable features such as complicated and expensive interlocking arrangements, lack of strength because of the interconnecting arrangements employed, or excessive weight where built up to overcome this difficulty. Particularly many of these prior arrangements have been unduly expensive because of the time and labor put into the multitude of joints occurring at the intersections of the longitudinal and transverse bars. In a grill of any size it is apparent that there is a very large number of joints involved so that any items of delay or expense involved with respect to a single joint multiply rapidly in the total structure. For example, it is frequently the case that these bars are connected by welding which is expensive and time consuming when considered in relation to all of the joints involved. Furthermore, in these prior arrangements there is a general prevalency to weakness in that the structure falls short of the strength it should have, for the weight of material and construction involved because of the forms of joints employed.

It is well known that structural members of this type exhibit greater strength under compression than they do under tension and that if in a structure of this type the load bearing members thereof could be placed initially under compression or pre-loaded a much stronger, more rigid structural member would result per unit of weight.

In accordance with this invention a simple, rapidly completed, mechanical interlocking structure is provided which pre-loads the longitudinal load bearing members by placing them initially under compression by reason of the form of joint employed. As will be apparent from the following detailed disclosure, the type of joint herein disclosed practically ensures against separation of the members unless they are strained to the point of destruction of the entire grill.

As illustrated in Figures 1 to 6, inclusive, there are provided a series of parallel longitudinally extending load bearing bars 1, each of which is provided with an open-ended rectangular notch 3 at the top edge thereof on the axis of each of the transverse bars. The transverse bars extend parallel to each other and at right angles to the longitudinal bars and are of considerably less vertical depth, as is clear from Figure 1. It is, of course, apparent that the number of longitudinal and transverse bars employed will depend upon the use to which the structure is to be put. The transverse bars are provided at the area of intersection of the longitudinal bars with a pair of depressions 4 on each side thereof which extend downwardly from the top edge and terminate at about the transverse center of the bar. As is clearly shown in the figures, these depressions 4 have a bottom which is longitudinally curved so that the low point of the depression is somewhere in the region of the center thereof. The width of the notches 3 is such as to receive the transverse bars 2 with a tight or driving fit.

When the bars are assembled the arrangement will look like that of Figure 4 where the portions of the notches 3 below the depressions 4 form a tight sliding fit with the sides of the bar 2. This leaves a very small space on the upper portion of the notches 3, as indicated at 7 in Figure 4. The transverse bars are locked into the longitudinal bars by squeezing the material of the longitudinal bars simultaneously on opposite faces and on opposite sides of the transverse bars, as indicated at 5 in Figures 1 and 5. By squeezing or compressing the material in this way it is caused, when sufficient pressure is employed, depending upon the nature of the material, to flow into the depressions or cavities 4 and to head up, as indicated at 6 in Figure 5. As is clear from Figure 6, the material in forming the headed portions 6 flow into the depressions or cavities 4 so as to fill them vertically, as well as transversely. The result is that the upper edges of the load bearing members are placed under compression even though unloaded in the sense that they have no external vertical loads thereon. It will be seen at once that the transverse members are very firmly and securely locked in the longitudinal members so that they may not have movement either in the direction of their lengths or transversely thereto. Thus by the simple expedient of forming the members as just described and then flowing the material by compression as explained, a remarkably strong structure results without employing the usual expedients of welding and the like. Obviously, therefore, at one and the same time, a highly practical and useful structure is produced at a comparatively lower cost.

In the arrangements of Figures 7, 8 and 9, the transverse bars 2 are constructed as before with the depressions or cavities 4 on each side thereof at the area of intersection with the longitudinal members. The longitudinal members in this case, as indicated at 1a, instead of being notched have struck out therefrom pairs of lugs 8 which are shortened sufficiently to permit of their being forced back into place, as shown in Figures 8 and 9. In other words, when the lugs 8 are back in the plane of the members 1a the separation between the ends thereof is less than the distance between the bottoms of the depressions 4. It follows, therefore, that with the transverse bars in place when the lugs 8 are pressed back into the plane of the members 1a the ends thereof are caused to flow so as to head them up as before and place the longitudinal members 1a under compression. Thus with this arrangement the transverse bars are as securely interlocked with the longitudinal bars as in the previous case.

In Figures 10 and 11 a third form of the invention is shown, in which case the transverse bars 2 are only provided at each joint with a depression 4 on one face. The longitudinal members 1b are notched as before and only one lug 10 is struck out therefrom. The length of this lug is such that when it is forced back into place with the bar 2 properly positioned the end of the lug heads up to securely lock the bar in place. This is clearly illustrated in Figure 11.

A further feature which may be employed in all the forms of the invention herein disclosed is illustrated in Figure 12 where a longitudinal member 1c is shown provided with a ridge 12 extending longitudinally thereof near the bottom by deforming the material to any suitable shape, of which the semi-circular shape illustrated is an example. By this simple expedient the bars, and hence a grill including them, when thus formed are capable of withstanding about twice the load that the undeformed bars are capable of withstanding for the same deflection. It is intended, therefore, to include within the scope of this invention structures like that previously described having the longitudinal load bearing members formed with strengthening ribs therein, as exemplified by Figure 12. For example, I have not emphasized in this disclosure the materials of which the structural members herein disclosed are made, it being apparent that there are many well known materials suitable for the purpose, of which iron and steel are common examples.

It is, of course, apparent to those skilled in the art that this invention may take other physical forms. I do not, therefore, desire to be limited to a scope of protection which includes only the forms of invention herein disclosed for purposes of illustration. I prefer to be limited only by the scope of the appended claims.

What I claim is:

1. A structural member of the type disclosed, including a series of longitudinally extending load bearing bars having slots on their upper edges, a series of transversely extending bars lying in said slots, said second series having a pair of cavities on the side faces thereof lying in each slot, and the portions of the longitudinal members adjacent the slots being expanded into said cavities to interlock said series of bars against relative longitudinal and transverse movement.

2. A grating of the type described including a series of longitudinally extending load bearing bars having slots on their upper edges, a series of transversely extending bars lying in said slots, each transverse bar having cavities on one side face lying in each slot respectively, said first series of bars being compressed at the sides along their top edges adjacent one side of each slot to expand the material thereof tightly into the adjacent cavity of the bars of the second series at the slots, whereby the longitudinal bars are pre-loaded under compression.

LAURENCE S. LACHMAN.